(12) United States Patent
Zheng

(10) Patent No.: US 7,909,697 B2
(45) Date of Patent: Mar. 22, 2011

(54) HAND-HELD INTERACTIVE GAME

(75) Inventor: Yu Zheng, Walnut, CA (US)

(73) Assignee: Patent Catefory Corp., Walnut, CA (US)

( * ) Notice: Subject to any disclaimer, the term of this patent is extended or adjusted under 35 U.S.C. 154(b) by 919 days.

(21) Appl. No.: 11/787,597

(22) Filed: Apr. 17, 2007

(65) Prior Publication Data

US 2008/0261694 A1 Oct. 23, 2008

(51) Int. Cl.
*A63F 13/00* (2006.01)
*A63F 9/24* (2006.01)
*A63H 30/00* (2006.01)

(52) U.S. Cl. ............. 463/35; 463/36; 273/238; 446/175

(58) Field of Classification Search .................... 463/37, 463/36, 7; 446/175; 273/238; 434/308, 434/309
See application file for complete search history.

(56) References Cited

U.S. PATENT DOCUMENTS

| | | | |
|---|---|---|---|
| 4,712,184 A | 12/1987 | Haugerud | |
| 4,770,416 A | 9/1988 | Shimizu et al. | |
| 5,026,058 A | 6/1991 | Bromley | |
| 5,212,368 A | 5/1993 | Hara | |
| 5,271,627 A | 12/1993 | Russell et al. | |
| D354,532 S | 1/1995 | Tornquist et al. | |
| 5,379,461 A | 1/1995 | Wilmers | |
| 5,411,259 A | 5/1995 | Pearson et al. | |
| 5,575,659 A | 11/1996 | King et al. | |
| 5,607,336 A | 3/1997 | Lebensfeld et al. | |
| 5,686,705 A | 11/1997 | Conroy et al. | |
| 5,728,960 A * | 3/1998 | Sitrick | 84/477 R |
| 5,746,602 A | 5/1998 | Kikinis | |
| 5,749,735 A | 5/1998 | Redford | |
| 5,766,077 A | 6/1998 | Hongo | |
| 5,853,327 A | 12/1998 | Gilboa | |
| 5,877,458 A | 3/1999 | Flowers | |
| 6,012,961 A | 1/2000 | Sharpe, III et al. | |
| 6,022,273 A | 2/2000 | Gabai | |
| 6,056,618 A | 5/2000 | Larian | |
| 6,086,478 A * | 7/2000 | Klitsner et al. | 463/35 |
| 6,110,000 A | 8/2000 | Ting | |

(Continued)

FOREIGN PATENT DOCUMENTS

EP         1486237        12/2004

(Continued)

OTHER PUBLICATIONS

ISR/Written Opinion from corresponding PCT/US08/057124—dated Jul. 29, 2008.

(Continued)

*Primary Examiner* — John M Hotaling, II
*Assistant Examiner* — Masud Ahmed
(74) *Attorney, Agent, or Firm* — Raymond Sun

(57) ABSTRACT

A game apparatus has a plurality of actuation devices in which at least two of the actuation devices require different mechanical actions for actuation. The apparatus further includes a speaker, a display screen, and a processor coupled to each of the actuation devices and to the display screen and the speaker. The processor outputs a first command signal to the speaker relating to a first actuation device, then outputs a second command signal to the speaker when the first actuation device is actuated, with the second command signal relating to a second actuation device. The processor outputs image signals to the display screen that are representative of the mechanical actions being taken.

7 Claims, 6 Drawing Sheets

U.S. PATENT DOCUMENTS

| | | | |
|---|---|---|---|
| 6,135,845 A | 10/2000 | Klimpert et al. | |
| 6,201,947 B1 | 3/2001 | Hur | |
| 6,210,278 B1 * | 4/2001 | Klitsner | 463/35 |
| 6,227,968 B1 * | 5/2001 | Suzuki et al. | 463/7 |
| 6,254,486 B1 | 7/2001 | Mathieu et al. | |
| 6,290,565 B1 | 9/2001 | Galyean, III et al. | |
| 6,290,566 B1 | 9/2001 | Gabai et al. | |
| 6,319,010 B1 | 11/2001 | Kikinis | |
| 6,319,087 B1 | 11/2001 | Ferrigno | |
| 6,357,566 B1 | 3/2002 | Pond | |
| 6,410,835 B2 * | 6/2002 | Suzuki et al. | 84/464 R |
| 6,416,326 B1 | 7/2002 | Oh | |
| 6,450,888 B1 * | 9/2002 | Takase et al. | 463/43 |
| 6,460,851 B1 | 10/2002 | Lee et al. | |
| 6,478,679 B1 | 11/2002 | Himoto | |
| 6,497,606 B2 | 12/2002 | Fong | |
| D470,540 S | 2/2003 | Seelig et al. | |
| 6,546,436 B1 | 4/2003 | Fainmesser et al. | |
| 6,554,679 B1 | 4/2003 | Shackelford et al. | |
| 6,558,225 B1 | 5/2003 | Rehkemper et al. | |
| 6,585,556 B2 | 7/2003 | Smirnov | |
| 6,595,780 B2 | 7/2003 | Singh et al. | |
| 6,612,501 B1 | 9/2003 | Woll et al. | |
| RE38,286 E | 10/2003 | Flowers | |
| 6,648,719 B2 | 11/2003 | Chan | |
| 6,661,405 B1 | 12/2003 | Flowers | |
| 6,663,393 B1 | 12/2003 | Ghaly | |
| 6,663,491 B2 * | 12/2003 | Watabe et al. | 463/36 |
| 6,668,156 B2 | 12/2003 | Lynch et al. | |
| 6,704,028 B2 | 3/2004 | Wugofski | |
| 6,719,604 B2 | 4/2004 | Chan | |
| 6,728,776 B1 | 4/2004 | Colbath | |
| 6,732,183 B1 | 5/2004 | Graham | |
| 6,733,325 B2 | 5/2004 | Sakai | |
| 6,758,678 B2 | 7/2004 | Van Gilder et al. | |
| 6,761,637 B2 | 7/2004 | Weston et al. | |
| 6,773,325 B1 * | 8/2004 | Mawle et al. | 446/175 |
| 6,801,815 B1 | 10/2004 | Filo et al. | |
| 6,801,968 B2 | 10/2004 | Hunter | |
| 6,811,491 B1 | 11/2004 | Levenberg et al. | |
| 6,814,662 B2 | 11/2004 | Sasaki et al. | |
| 6,814,667 B2 | 11/2004 | Jeffway, Jr. et al. | |
| 6,877,096 B1 | 4/2005 | Chung | |
| 6,949,003 B2 | 9/2005 | Hornsby et al. | |
| 7,033,243 B2 | 4/2006 | Hornsby et al. | |
| 7,035,583 B2 | 4/2006 | Ferringno et al. | |
| 7,054,949 B2 | 5/2006 | Jennings | |
| 7,073,191 B2 | 7/2006 | Srikantan et al. | |
| 7,081,033 B1 * | 7/2006 | Mawle et al. | 446/175 |
| 7,096,272 B1 | 8/2006 | Raman | |
| 7,117,439 B2 | 10/2006 | Barrett et al. | |
| 7,118,482 B2 | 10/2006 | Ishihara et al. | |
| 7,120,653 B2 | 10/2006 | Alfieri et al. | |
| 7,131,887 B2 | 11/2006 | Hornsby et al. | |
| 2002/0028710 A1 | 3/2002 | Ishihara et al. | |
| 2002/0073084 A1 | 6/2002 | Kauffman et al. | |
| 2002/0111808 A1 | 8/2002 | Fienberg | |
| 2002/0125318 A1 | 9/2002 | Tatsuta et al. | |
| 2003/0148700 A1 | 8/2003 | Arlinsky et al. | |
| 2004/0043365 A1 | 3/2004 | Kelley et al. | |
| 2004/0081110 A1 | 4/2004 | Koskimies | |
| 2004/0087242 A1 | 5/2004 | Hagerman et al. | |
| 2004/0127140 A1 | 7/2004 | Kelly et al. | |
| 2004/0191741 A1 | 9/2004 | Ferringino et al. | |
| 2004/0197757 A1 | 10/2004 | Musolf | |
| 2004/0203317 A1 | 10/2004 | Small | |
| 2004/0214642 A1 | 10/2004 | Beck | |
| 2004/0259465 A1 | 12/2004 | Wright et al. | |
| 2005/0009610 A1 | 1/2005 | Miyamoto et al. | |
| 2005/0048457 A1 | 3/2005 | Ferringino et al. | |
| 2005/0216936 A1 | 9/2005 | Knudson et al. | |
| 2008/0004111 A1 * | 1/2008 | Prather et al. | 463/36 |

FOREIGN PATENT DOCUMENTS

| | | |
|---|---|---|
| GB | 2 275 207 A | 8/1994 |
| KR | 10-2003-0057497 | 7/2003 |
| WO | WO 84/00503 | 2/1984 |
| WO | WO99/64657 | 12/1999 |
| WO | WO 00/09229 | 2/2000 |
| WO | WO 01/97937 | 12/2001 |
| WO | WO 02/47013 | 6/2002 |
| WO | WO2004/006197 | 1/2004 |
| WO | WO 2004/054123 | 6/2004 |

OTHER PUBLICATIONS

ISR/Written Opinion from corresponding PCT/US08/80621—dated Jul. 31, 2008.
Extended European Search Report dated Aug. 20, 2007 for European Application No. 06021643.9.
ISR/Written Opinion from PCT/US07/79566 dated Sep. 15, 2008.
ISR/Written Opinion from PCT/US07/16549—Aug. 21, 2008.
European Search Report dated Jun. 6, 2007 for European Application No. 06021643.9.

* cited by examiner

HAND-HELD INTERACTIVE GAME

BACKGROUND OF THE INVENTION

1. Field of the Invention

The present invention relates to an interactive system, and to an interactive game that can be played by a single player or by multiple players.

2. Description of the Prior Art

There currently exists hand-held games that generate voice instructions or sound prompts which require a player to perform an operation or otherwise respond to these instructions or prompts.

As an example, U.S. Pat. No. 6,086,478 discloses a hand-held voice game that requires a player to select between different operations depending on the sound prompt generated by the game. Other examples are illustrated in U.S. Pat. Nos. 4,770,416 and 5,271,627.

Most of these games provide only audio output for the voice instructions or sound prompts. Thus, the child or user only receives primarily an audio response, which is not always effective in creating or simulating a more "real" or "live" environment for the game.

SUMMARY OF THE INVENTION

It is an object of the present invention to provide an interactive game that provides the user with a "live" experience.

In order to accomplish the above-described and other objects of the present invention, the present invention provides a game apparatus having a plurality of actuation devices in which at least two of the actuation devices require different mechanical actions for actuation. The apparatus further includes a speaker, a display screen, and a processor coupled to each of the actuation devices and to the display screen and the speaker. The processor outputs a first command signal to the speaker relating to a first actuation device, then outputs a second command signal to the speaker when the first actuation device is actuated, with the second command signal relating to a second actuation device. The processor outputs image signals to the display screen that are representative of the mechanical actions being taken. The processor can also output an error signal to the speaker if the first actuation device is not actuated within a predetermined period of time, or when an actuation device other than the first actuation device is actuated in response to the first command signal.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides an interactive game, and in some embodiments, a game system, which simulates a "live" experience for the user. In one embodiment, the present invention can be embodied in the form of an interactive game that simulates a "live" experience associated with the tasks to be performed by the player. In another embodiment, the present invention can be embodied in the form of an interactive game system.

Figure 1:
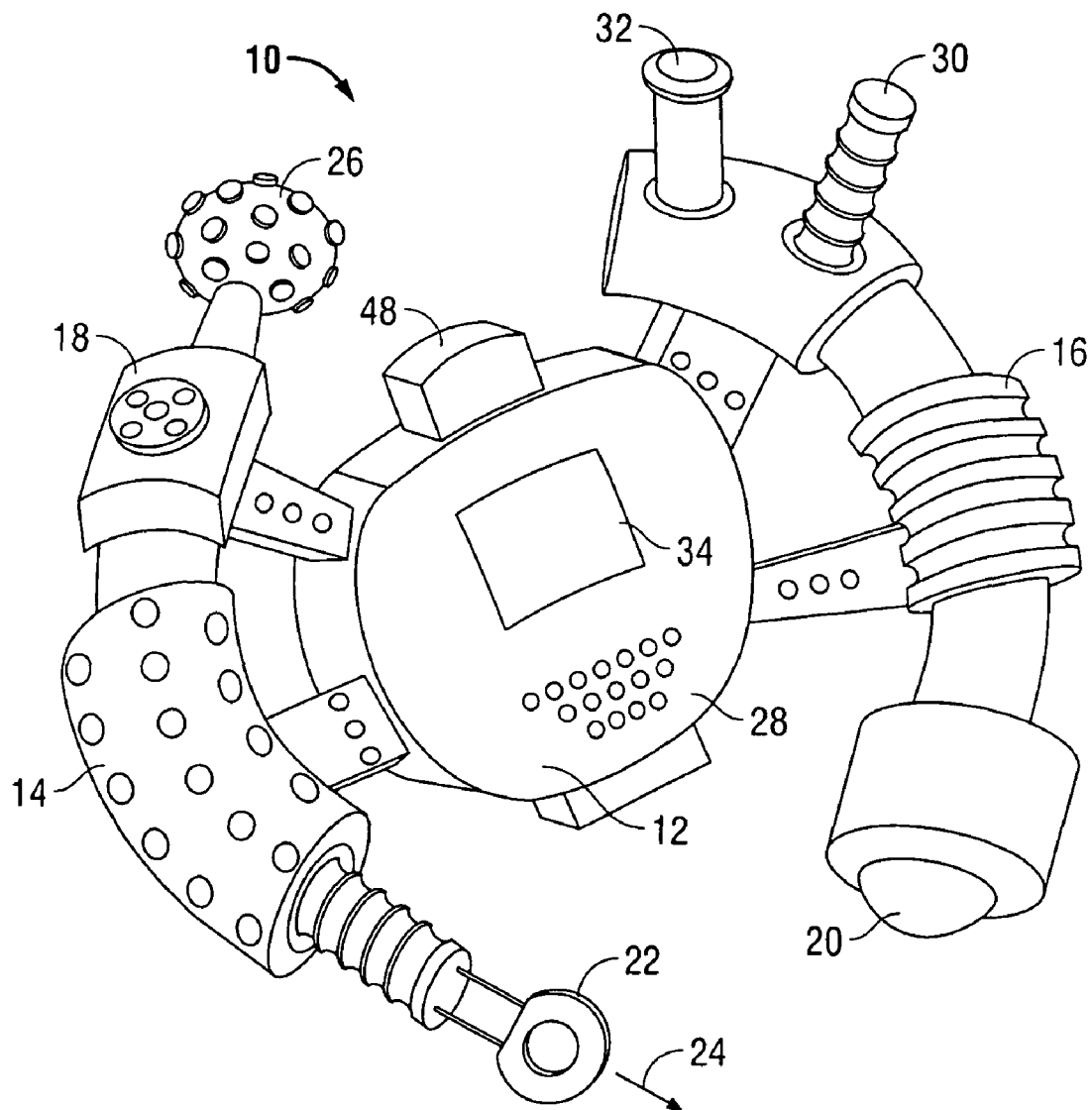
FIG. 1 is a perspective view of an interactive game according to one embodiment of the present invention.

FIG. 1 illustrates an interactive game 10 according to one embodiment of the present invention. The game 10 includes a housing that includes a central body portion 12, and two side handle portions 14 and 16 that can be gripped by the hands of a player. A variety of actuation devices are accessible at different locations of the housing. For example, the actuation devices can include pressure switches 18 and 20 (also referred to herein as a bop it button) that can be provided on both handle portions 14 and 16 so that the player can actuate a bop it button 18 or 20 with either hand. The actuation devices can also include a pull switch 22 (also referred to herein as a pull knob) that is located at an end of a handle portion 14. The pull knob 22 can be actuated by pulling the knob 22 along an axial axis 24 extending along the handle portion 14. The actuation devices can also include a rotational switch 26 (also referred to herein as a twist knob) that is located at the other opposing end of the handle portion 14, and is actuated by twisting the knob 26. The actuation devices can further include lever switches 30 and 32 (also referred to herein as a pivot knob) that are located along the handle portion 16, and are actuated by pivoting the knob 30 or 32. The buttons 18, 20 and knobs 22, 26, 30, 32 are merely non-limiting examples, and other actuation devices can be provided on any of the handle portions 14, 16, or on the body portion 12.

A speaker 28 and a display screen 34 can be provided in the body portion 12. The speaker 28 outputs audio sounds, instructions and prompts, while an image or streaming video can be simultaneously played on the screen 36. The image or video can illustrate or represent features or characteristics of the game being played, thereby providing the player with a "live" environment associated with the game.

Figure 2:
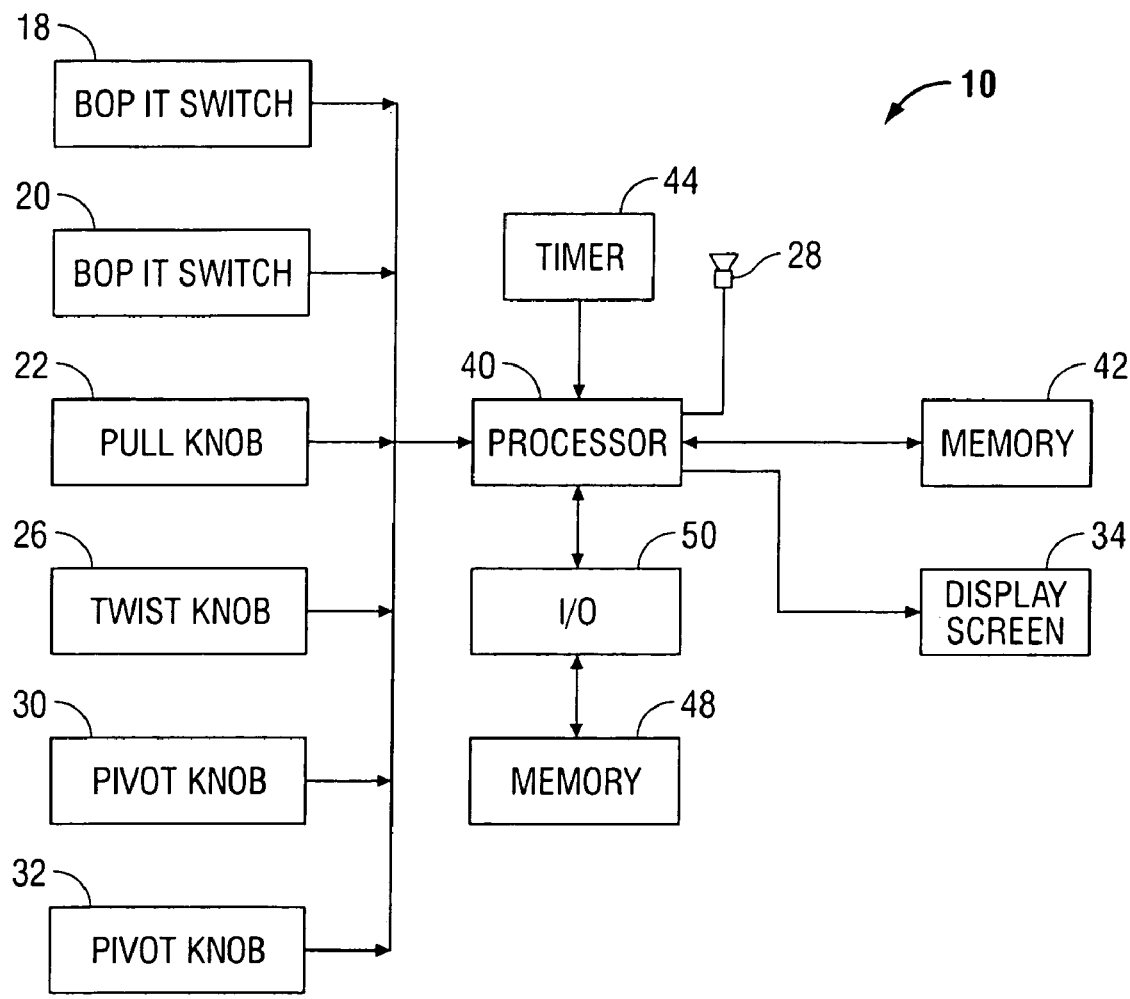
FIG. 2 is a schematic block diagram of the electronics of the game of FIG. 1.

FIG. 2 is a schematic block diagram of the electronics of the game 10. A processor 40 is electrically coupled to a memory 42, a timer 44, the speaker 28, the display screen 34, the buttons 18, 20, and the knobs 22, 26, 30, 32. The processor 40 operates under the control of one or more programs stored in the memory 42, which can be a ROM or a RAM. The memory 42 can also store data relating to the voice instructions and relating to sounds or prompts that are generated during the course of play. The memory 42 can also store data relating to the images or video to be displayed at the screen 34. The timer 44 can be used for measuring a predetermined period of time in which the selected actuation device must be actuated for game play to progress, and for generating a game tempo that increases randomly as game play progresses. The processor 40, the memory 42 and the timer 44 are readily available integrated circuits that have operational capabilities that are suitable for providing the functions of the present invention. In addition, these functions can be performed by an ASIC, dedicated logic circuits, or by a state machine.

The processor 40 receives actuation signals generated by each of the buttons 18, 20 and the knobs 22, 26, 30, 32, and determines whether it corresponds to the selected actuation device that the player was instructed to actuate. If a player actuates the correct actuation device in response to an instruction within the predetermined period of time, the processor 40 selects another (or even the same) actuation device at random and generates corresponding command signals that are output to both the speaker 28 and the screen 34. The speaker 28 would output the voice instruction while the screen 34 would display images or a video that accompanies or enhances the action or command. For example, bright colors or flashing lights can be displayed at the screen 34, or a video showing a player pivoting a lever can accompany a command that instructs the player to pivot a lever knob 30, 32. If a player actuates an incorrect actuation device, or does not actuate the correct actuation device within the predetermined period of time, as measured by the timer 44, the processor 40 generates an error signal to be output to either or both the speaker 28 and/or the screen 34. The signal can be output as an alarm, a beep, or flashing lights (accompanied by visual or voice instructions). Any of these buttons 18, 20 or knobs 22, 26, 30, 32 can be used to control the operation of the game 10. For example, the buttons 18, 20 can also function as control buttons that allow a player to select options, games, formats, and to turn the game 10 on or off.

A separate external memory 48, such as a compact disk or cartridge that accompanies (or is sold with) the game 10, can be removably coupled to the body portion 12 of the housing. The external memory 48 can be coupled with the processor 40 via an input/output (I/O) interface 50, which can be embodied in the form of a socket or port provided on the body portion 12. The memory 48 can be used to store data and programs for different games that can be downloaded to the memory 42 for execution by the processor 40.

A power supply (not shown) can be provided in the housing and coupled to the electronics in FIG. 2, and can be embodied in the form of any conventional power supply, including batteries.

In use, the user turns on the game 10, and manipulates the buttons 18, 20 to select a desired program for play. The program can be stored in either or both the memories 42 and/or 48. The processor 40 will then execute the selected program, with the speaker 28 broadcasting voice instructions and/or accompanying sounds or music, while the screen 34 is simultaneously displaying images or video associated with the game.

Figure 3:
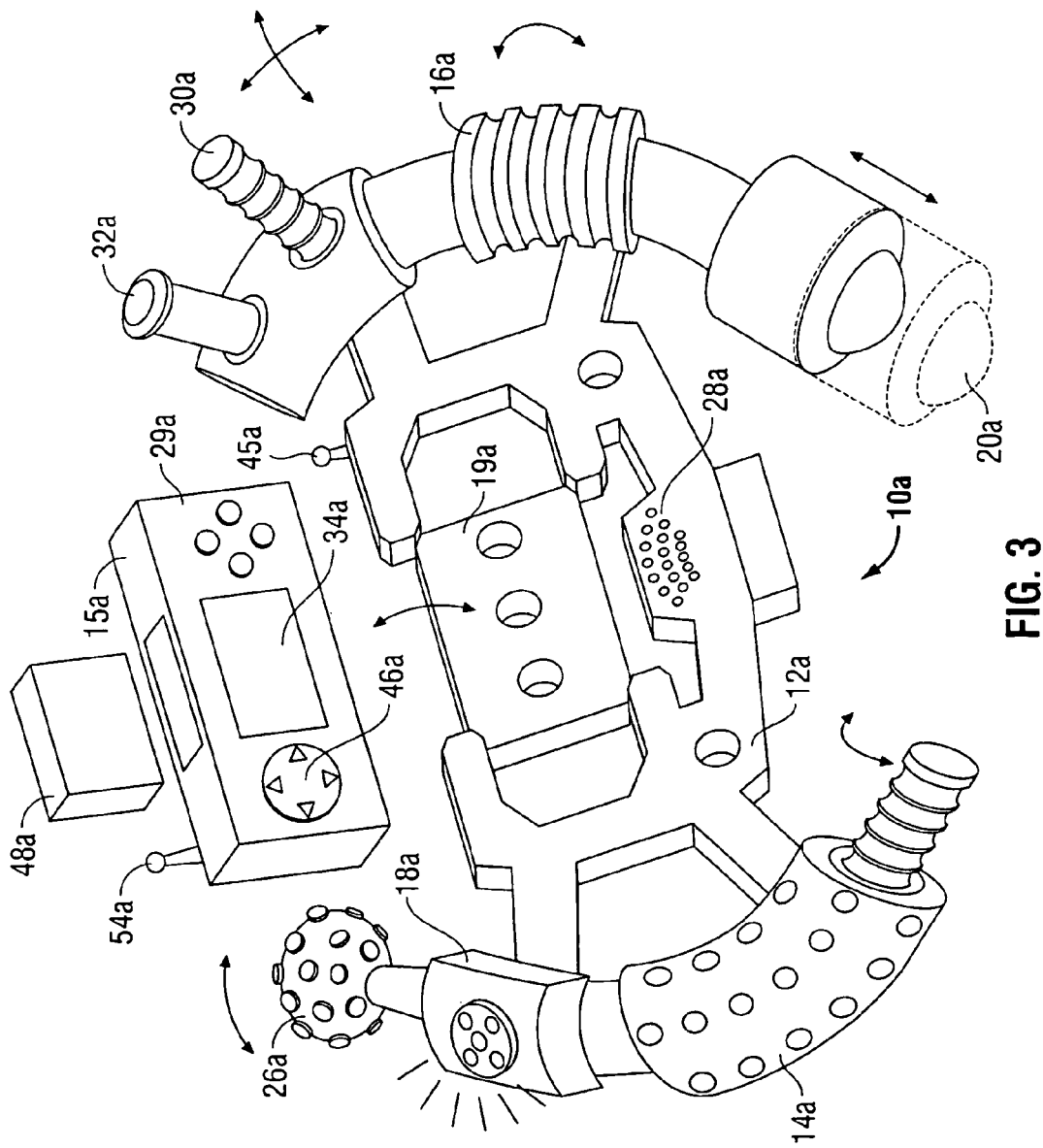
FIG. 3 is a perspective view of an interactive game according to another embodiment of the present invention.
Figure 4:
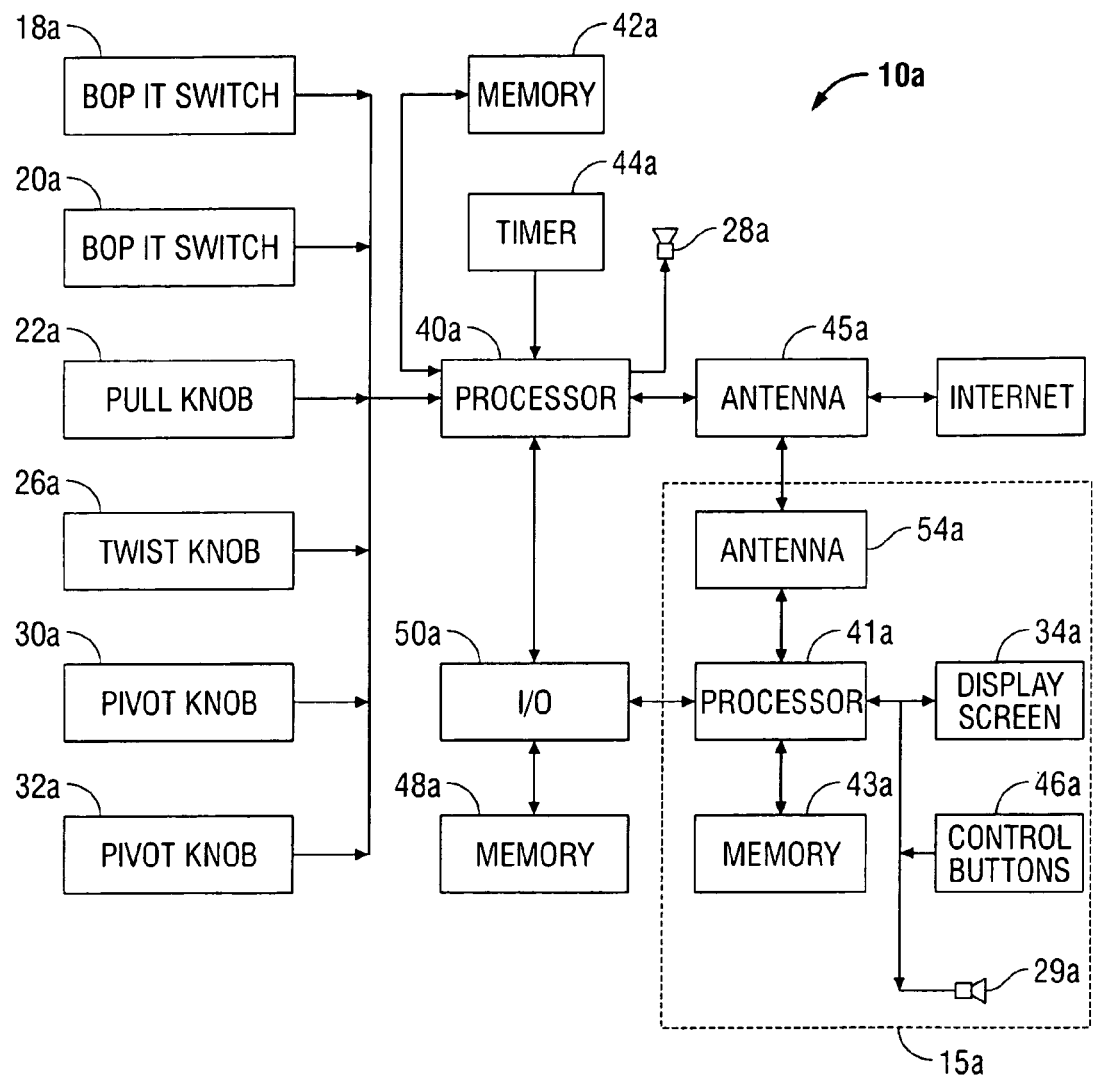
FIG. 4 is a schematic block diagram of the electronics of the game of FIG. 3.

FIGS. 3 and 4 illustrate a modification that can be made to the game 10 in FIG. 1. In the embodiment 10*a* of FIGS. 3 and 4, the same numeral designations will be used to designate the same elements in FIGS. 1 and 2, except that an "a" will be added to the numeral in FIGS. 3 and 4. In FIGS. 3 and 4, the body portion 12*a* includes a hand-held unit 15*a* that can be removably coupled to a receiving well 19*a* in the body portion 12*a*. The hand-held unit 15*a* includes another processor 41*a* and another speaker 29*a*, with another memory 43*a*, the screen 34*a*, and other control buttons 46*a* provided on the housing of the hand-held unit 15*a* all being coupled to the processor 41*a*. The port 50*a* can be coupled to the processor 41*a* to facilitate communication with the external memory 48*a*, although the port 50*a* can also be provided (see dotted lines in FIG. 4) on the body portion 12*a* and coupled to the processor 40*a*. An antenna 45*a* is provided on the body portion 12*a*, and coupled to the processor 40*a*. Similarly, an antenna 54*a* is provided on the housing of the hand-held unit 15*a*, and coupled to the processor 41*a*. The antennas 45*a*, 54*a* communicate signals with each other to facilitate the exchange of information, data, and programs between the respective processors 40*a* and 41*a*.

The embodiment 10*a* in FIGS. 3 and 4 allow the game 10*a* to be used as a multi-player game. In one example, a first player can hold the hand-held unit 15*a* and manipulate the buttons 46*a* to select the actuation device to be actuated, using the screen 34*a* to see what he/she is selecting. A second player holds the handle portions 14*a*, 16*a* and attempts to actuate the actuation device selected by the first player. The processor 41*a* communicates the appropriate command signals via the antennas 45*a*, 54*a* to the processor 40*a*, which causes the speaker 28*a* to broadcast the appropriate voice instructions. Alternatively, the processor 41*a* can also cause the speaker 29*a* to broadcast the appropriate voice instructions. If the second player actuates the correct actuation device in response to an instruction within the predetermined period of time, the first player can select another (or even the same) actuation device at random and generates corresponding command signals that are output to the speaker(s) 28*a* and/or 29*a*, and the screen 34*a*.

The embodiment 10*a* can even be coupled via the antenna 45*a* to the Internet for communication with a remote user at a remote computer or a remote hand-held unit 15*a*.

Figure 5:
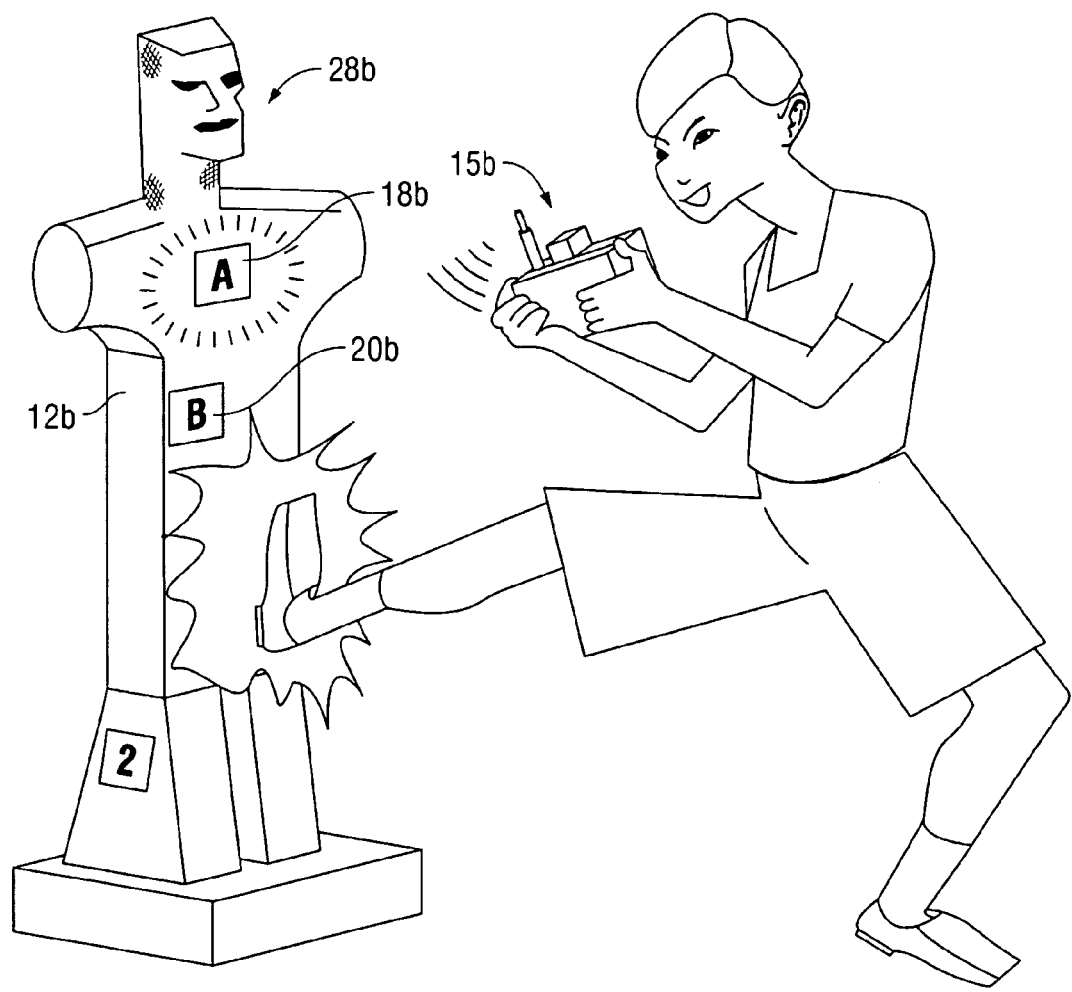
FIG. 5 is a perspective view of an interactive game system according to another embodiment of the present invention.

FIG. 5 illustrates how the game 10*a* in FIGS. 3 and 4 can be modified or extended to different applications. In FIG. 5, the body portion 12*a* and handle portions 14*a*, 16*a* are replaced by a solid FIG. 12*b* that can be essentially the same as the portions 12*a*, 14*a*, 16*a* combined. The FIG. 12*b* has a housing with a plurality of pressure switches 18*b* and 20*b* provided thereon, which can be the same as the switches 18*a*, 20*a*. The player holds a hand-held unit 15*b* (which can be the same as 15*a*) and can engage in a number of different play modes.

In one example, the processor (not shown, but can be the same as 40*a*) in the FIG. 12*b* executes a program which broadcasts (via a speaker 28*b*) the name of the body part (e.g., chest) that needs to be struck. The player then attempts to strike the switch 18*b* at that body part in a similar manner as actuating an actuation device in the game 10*a*, with the screen (not shown, but can be the same as 34*a*) on the hand-held unit 15*b* receiving signals from the processor at the FIG. 12*b* to display images or a video associated with striking the appropriate body part.

In another example, the processor (not shown, but can be the same as 41*a*) in the hand-held unit 15*b* executes a program which allows the player to select the body part to be struck. The processor in the hand-held unit 15*b* communicates the information to the processor in the FIG. 12*b*, which then causes the speaker 28*b* to voice the appropriate instructions. When a switch 18*b* or 20*b* is struck, the processor in the FIG. 12*b* receives a signal from the struck switch 18*b* or 20*b*, and conveys the information to the processor in the hand-held unit 15*b* which then determines whether the correct switch 18*b* or 20*b* has been struck.

In yet a further example, the FIG. 12*b* can be modified to be a floor mat having floor switches that are similar to the switches 18*b*, 20*b*. The play pattern can be the same as described above in connection with striking selected switches 18*b*, 20*b*, except the player is now instructed to step on selected floor switches to actuate these switches in a manner which simulates a dance routine or other foot-stepping routine.

Figure 6:
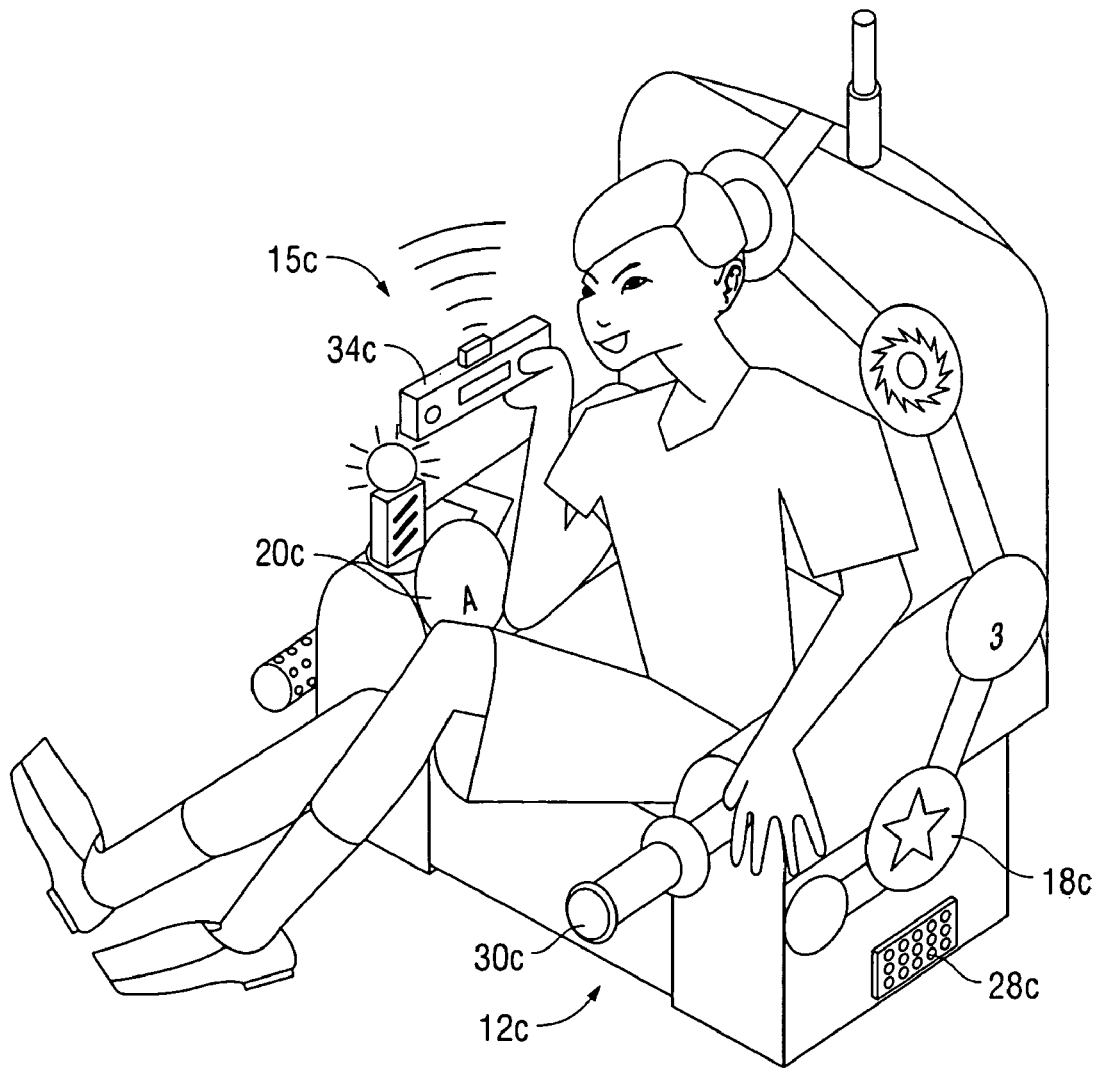
FIG. 6 is a perspective view of an interactive game system according to yet another embodiment of the present invention.

FIG. 6 provides another illustration of how the game 10*a* in FIGS. 3 and 4 can be modified or extended to different applications. In FIG. 6, the body portion 12*a* and handle portions 14*a*, 16*a* are replaced by a chair 12*c* that can be essentially the same as the portions 12*a*, 14*a*, 16*a* combined. The chair 12*c* has a plurality of pressure switches 18*c* and 20*c*, or other knobs 30*c*, provided thereon, which can be the same as the switches 18*a*, 20*a* and knobs 30*a*, 32*a*. The player holds a hand-held unit 15*c* (which can be the same as 15*a*) and can engage in a number of different play modes.

In one example, the processor (not shown, but can be the same as 40a) in the chair 12c executes a program which broadcasts via a speaker 28c the part (e.g., arm-rest) of the chair 12c that needs to be struck. The player then attempts to strike the switch 18c at that part in a similar manner as actuating an actuation device in the game 10a, with the screen 34c (which can be the same as 34a) on the hand-held unit 15c receiving signals from the processor at the chair 12c to display images or a video associated with striking the appropriate part.

In another example, the processor (not shown, but can be the same as 41a) in the hand-held unit 15c executes a program which allows the player to select the part to be struck. The processor in the hand-held unit 15c communicates the information to the processor in the chair 12c, which then causes the speaker 28c to voice the appropriate instructions. When a switch 18c is struck or a knob 30c is pivoted, the processor in the chair 12c receives a signal from the struck switch 18c or pivoted knob 30c, and conveys the information to the processor in the hand-held unit 15c which then determines whether the correct switch 18c or knob 30c has been struck or pivoted.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An interactive game system, comprising:
   a) a game object having:
   a plurality of actuation devices in which at least two of the actuation devices require different mechanical actions for actuation;
   a speaker; a communication device; and a processor coupled to each of the actuation devices and to the speaker and the communication device, the processor outputting a first command signal to the speaker for a first actuation device to be actuated, the processor outputting a second command signal to the speaker when the first actuation device is actuated, the second command signal for a second actuation device to be actuated, and outputting an error signal to the speaker if the first actuation device is not actuated within a predetermined period of time; and
   b) a hand-held unit having:
   control buttons;
   a display screen;
   a communication device that communicates signals with the communication device of the game object; and
   a processor coupled to the control buttons, the display screen and the communication device of the hand-held unit, the processor of the hand-held unit outputting image signals to the display screen that is representative of the mechanical actions being taken on the game object.

2. The system of claim 1, wherein the processor of the game object outputs the error signal to the speaker when an actuation device other than the first actuation device is actuated in response to the first command signal.

3. An interactive game system, comprising:
   a) a game object having:
   a plurality of actuation devices in which at least two of the actuation devices require different mechanical actions for actuation;
   a communication device; and
   a processor coupled to each of the actuation devices and to the communication device;
   b) a hand-held unit having:
   control buttons;
   a speaker;
   a display screen that is representative of the mechanical actions being taken on the game object;
   a communication device that communicates signals with the communication device of the game object; and
   a processor coupled to the control buttons, the speaker, the display screen and the communication device of the hand-held unit, the processor of the hand-held unit outputting: (i) image signals to the display screen that are representative of the mechanical actions being taken on the game object, (ii) a first command signal to the speaker for a first actuation device to be actuated, (iii) a second command signal to the speaker when the first actuation device is actuated, the second command signal is for a second actuation device to be actuated, and (iv) an error signal to the speaker if the first actuation device is not actuated within a predetermined period of time.

4. The system of claim 3, wherein the processor of the hand held unit outputs the error signal to the speaker when an actuation device other than the first actuation device is actuated in response to the first command signal.

5. A method of playing a game between two players, comprising:
   a) providing a first player with a game object having:
   a plurality of actuation devices in which at least two of the actuation devices require different mechanical actions for actuation; a communication device;
   a game object processor coupled to each of the actuation devices and to the communication device; and
   means for indicating the actuation device to be actuated;
   b) providing a second player with a hand-held unit having:
   control buttons;
   a speaker;
   a display screen that is representative of the mechanical actions being taken on the game object;
   a communication device that communicates signals with the communication device of the game object;
   said hand-held unit processor coupled to the control buttons, the speaker, the display screen and the communication device of the hand-held unit;
   c) the second player manipulating the control buttons to select an actuation device to be actuated, the signals generated by the selected control buttons causing the hand-held unit processor to communicate control signals to the game object processor which in turn cause the indicating means to indicate the selected actuation device;
   d) the first player attempting to actuate the selected actuation device;
   e) outputting an error message if the first player does not actuate the selected actuation device within a predetermined period of time; and
   f) repeating steps (c) and (d) if the first player actuates the selected actuation device within a predetermined period of time.

6. The method of claim 5, wherein step (e) further includes outputting an error signal to a speaker when an actuation device other than the selected actuation device is actuated.

7. The method of claim 5, wherein step (e) further includes outputting an error signal to a speaker if the selected actuation device is not actuated within a predetermined period of time.

* * * * *